United States Patent Office
3,527,593
Patented Sept. 8, 1970

3,527,593
HERBICIDE-AMINE OXIDE COMPOSITIONS AND THEIR USE
Robert Coles Brian and Peter Douglas Bland, Bracknell, England, assignors to Imperial Chemical Industries Limited, London, England, a corporation of Great Britain
No Drawing. Filed Nov. 30, 1966, Ser. No. 597,849
Claims priority, application Great Britain, Dec. 20, 1965, 53,824/65
Int. Cl. A01n 9/20, 11/02
U.S. Cl. 71—94                 16 Claims

ABSTRACT OF THE DISCLOSURE

Herbicidal compositions containing herbicide and an amine oxide wetting agent. Preferred herbicides are the bipyridylium herbicides while typical amine oxides include, for example, octyl dimethylamine N-oxide and the corresponding decyl-, dodecyl-, tetradecyl-, pentadecyl- and hexadecyl-dimethylamine N-oxides.

---

The present invention relates to improved herbicidal compositions and to their use.

It has been found that although herbicides are frequently employed in the form of compositions containing a wetting agent, the use of an amine oxide surface active agent renders the composition more effective and appears to assist in the dissemination of the herbicide throughout the plant system.

Accordingly, the present invention comprises a composition containing a herbicide and an amine oxide wetting agent. It further comprises a process of treating plants with such compositions.

Examples of suitable herbicides include herbicidal amides, carbamates, ureas, triazines, phenoxycarboxylic acids and inorganic compounds. Examples of specific compounds are:

AMIDES
N,N-diallylchloroacetamide
3,4-dichloropropionanilide
N-(3-chloro-4-methyl-phenyl)-2-methylpentamide
N-(3,4-dichlorophenyl)-methacrylamide
N,N-dimethyldiphenylacetamide

CARBAMATES
Isopropyl-N-phenylcarbamate
Isopropyl-N-(3-chlorophenyl) carbamate
4-chloro-2-but-ynyl-N-(3-chlorophenyl) carbamate
2-chlorallyl-N,N-diethyl-dithiocarbamate
S-ethyl-N,N-dipropylthiol carbamate
S-propyl-N-butyl-N-ethylthiolcarbamate
S-2,3-dichlorallyl-N,N-di-isopropyl thiolcarbamate
S-2,3,3-trichlorallyl-N,N-di-isopropyl thiolcarbamate
Sodium N-methyldithiocarbamate

UREAS AND ANILIDES
N,N'-di-(2,2,2-trichloro-1-hydroxyethyl)urea
O-chloroisobutyranilide
α-Bromo-3,4-dichloroacetanilide
N,N-dimethyl-N'-phenylthiourea
N-phenyl-N',N-dimethyl urea
N-(4-chlorophenyl)-N',N'-dimethyl urea
N'-(4-chlorophenyl)-N-methoxy-N-methylurea
N-thiourea(3,4-dichlorophenyl)-N',N'-dimethyl urea
N-butyl-N'-(3,4-dichlorophenyl)-N-methyl urea
N'-(3,4-dichlorophenyl)-N-methoxy-N-methyl urea
N'-4-(4-chlorophenoxy)-phenyl-N,N-dimethyl urea

DIAZINES
3,4,5,6-tetrahydro-3,5-dimethyl-2-thio-2H-1,3,5-thiadiazine
5-bromo-3-s-butyl-6-methyluracil
5-amino-4-chloro-2-phenyl-3-pyridazone
1,2,3,6-tetrahydro-3,6-dioxopyridazine
2-chloro-4,6-bisethylamino-1,3,5-triazine
2-chloro-4-ethylamino-6-isopropylamino-1,3,5-triazine
2-chloro-4,6-bisisopropylamino-1,3,5-triazine
4-ethylamino-6-isopropylamino-2-methoxy-1,3,5-triazine
4,6-bisisopropylamino-2-methoxy-1,3,5-triazine
2-methylmercapto-4,6-bisethylamino-s-triazine
2-methylmercapto-4,6-bisisopropylamino-s-triazine
2-methylmercapto-4-ethylamino-6-isopropylamino-s-triazine
2-chloro-4-diethylamino-6-ethylamino-1,3,5-triazine
4,6-bisethylamino-2-methoxy-1,3,5-triazine
4-isopropylamino-6-methylamino-2-methylmercapto-1,3,5-triazine

PHENOXYCARBOXYLIC ACID HERBICIDES
4-chloro-2-methyl phenoxyacetic acid
2,4 dichlorophenoxyacetic acid
2,4,5 trichlorophenoxyacetic acid
2-(4, chloro-2-ethylphenoxy)propionic acid
α-(2,4, dichlorophenoxy)propionic acid
γ-2,4,5 trichlorophenoxy)butyric acid

INORGANIC HERBICIDES
Sodium chlorate
Sodium arsenite
Ammonium sulphamate
Potassium cyanate Preferred compositions in accordance with the invention are those including a bipyridylium compound as the herbicide. Such compounds are preferably in the form of bipyridylium salts and suitable compounds include those having a cation of the formula:

wherein R and R¹ are aliphatic groups which may be the same or different, associated with one or more suitable anionic radicals or groups. R and R¹ are preferably alkyl groups having from 1 to 20 carbon atoms. Either R or R¹ may be unsaturated or be substituted.

Other compounds which may be used have a cationic group of the general formula:

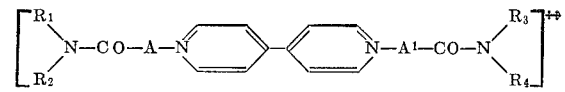

wherein $R_1$, $R_2$, $R_3$ and $R_4$ are hydrogen, alkyl, alkoxyalkyl, A and $A^1$ comprise a divalent aliphatic group, for example one or more methylene groups, associated with one or more suitable anionic radicals or groups not represented in the formula.

Compounds also having herbicidal activity have the quadrivalent cationic group of the general formula:

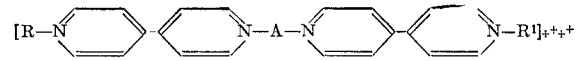

wherein R and R¹ are substituted or unsubstituted alkyl groups having from 1 to 20 carbon atoms and A is a divalent aliphatic bridging group which preferably comprises from 1 to 6 methylene groups. Suitable anionic groups for all the above bipyridylium compounds are represented by the halides, though many other anions may also be used, e.g. phosphate, sulphate, acetate, nitrate.

Specific examples of suitable compounds are:

1,1'-dimethyl-4,4'-bipyridylium dichloride
1,1'-dimethyl-4,4'-bipyridylium dimethosulphate
1,1'-bis-β-chloroethyl-4,4'-bipyridylium dibromide 1,1'-bis-β-ethoxyethyl-4,4'-bipyridylium dichloride
1,1'-bis-carboxymethyl-4,4'-bipyridylium dichloride
1,1'-bis(-β-hydroxyhexylethyl)-4,4'-bipyridylium dibromide
1,1'-bis-γ-pyrrolidinopropyl-4,4'-bipyridylium diiodide
1,1'-bis(dimethylcarbamoylmethyl)-4,4'-bipyridylium dichloride
1,1'-bis(diethylcarbamoylmethyl)-4,4'-bipyridylium dichloride
1,1'-bis(di-isopropylcarbamoylmethyl)-4,4'-bipyridylium dichloride
1,1'-di(3-ethoxycarbamoylpropyl)-4,4'-bipyridylium dibromide
1-n-butyl-1'-methyl-4,4'-bipyridylium dibromide
1-ethyl-1'-methyl-4,4'-bipyridylium diiodide
1,1'-ethylene-2,2'-bipyridylium dichloride
1,1'-ethylene-5,5'-dimethyl-2,2'-bipyridylium dibromide
1,1'-ethylene-4,4'-dimethyl-2,2'-bipyridylium dibromide.

Amine oxides preferably employed in the present compositions are those wherein the nitrogen atom of the amine oxide bears at least one long chain aliphatic group having from 5 to 25 carbon atoms. Such amine oxides include, for example, octyl dimethylamine N-oxide and corresponding decyl-, dodecyl-, tetradecyl-, pentadecyl-, and hexadecyl-dimethylamine N-oxides; and the decyl-, dodecyl-, tetradecyl- and hexadecyl-diethylamine N-oxides or di(2-hydroxy-ethyl)amine N-oxides.

Further useful amine oxides include:

Dodecyl di(2,3 dihydroxypropyl)amine N-oxide (and its $C_{14}$, $C_{15}$, $C_{16}$ and $C_{18}$ analogues)
Tridecyl di(2-hydroxyethyl)amine N-oxide
Dodecyl ethyl (2-hydroxyethyl)amine N-oxide
Dodecyl ethyl methylamine N-oxide
2,3-dihydroxypropyl ethyl tetradecylamine N-oxide
Ethyl 3-hydroxypropyl tetradecylamine N-oxide
Di(2-hydroxypropyl)dodecylamine N-oxide
Dialkyl dodecylamine N-oxide
Dodecyl hexamethyleneamine N-oxide
Dodecyl piperidine N-oxide
Dodecyl pyrrolidine N-oxide
Dihexyl 2-hydroxyethyl amine N-oxide (and the dioctyl and didecyl analogues)
Dihexyl 2,3-dihydroxypropyl amine N-oxide (and the dioctyl analogue)
4-undecyl pyridine N-oxide
4-butyl N:N-dimethyl aniline N-oxide (and the 4-octyl analogue)
2-hexyloctyl di(2-hydroxyethyl) amine N-oxide.

Mixtures of amine oxides may conveniently be used.
Other amine oxides are: Dodecyl di-carbethoxymethylamine N-oxide; and dodecyl di(2-3-dihydroxypropyl)-amine N-oxide, and still further amine oxides found to be satisfactory in use are:

Dodecyl morpholine N-oxide
Decyl and dodecyl di(2 hydroxyethyl)amine-dimethylamine N-oxide
Dodecyl N-oxide
Tetradecyl di(hydroxymethyl)amine N-oxide
Hexadecyl di(hydroxymethyl)amine N-oxide.

Wetting agent compositions consisting essentially of one or more of the five amine oxides last indicated above are available commercially under the registered trademarks "Aromox," "Ammonyx" and "Pargasol."

Useful amine oxide wetters may be obtained from amines formed by condensing primary amines with ethylene oxide to give compounds of the formula:

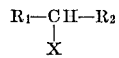

Such condensates are mixtures of compounds having a range of values for $x$ and $y$. A particularly useful wetter is that obtained from the amine formed by condensing five molar proportions of ethylene oxide with one molar proportion of cocoamine (a mixture of primary amine containing from 12 to 16 carbon atoms per molecule). This material is referred to hereinafter as DS4443.

The amine oxides form salts, for example hydrochlorides or benzenesulphonates, and may conveniently be employed in this form in the production of a final herbicidal liquid composition.

The amine oxide or salt is conveniently also employed in conjunction with an additive, which is an aliphatic compound having the formula:

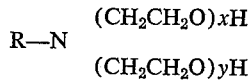

where X may be any of the following groups: —OH, —COOH, —NH$_2$, —CONH$_2$, —O·CO·H; $R_1$ is a straight chain alkyl or alkoxyalkyl groups having from 4 to 11 carbon atoms; $R_2$ is hydrogen, or a straight chain alkyl or alkoxyalkyl group having from 3 to 5 carbon atoms and the total number of carbon atoms in the groups $R_1$ and $R_2$ is between 7 and 11 inclusive. Preferably $R_2$ is hydrogen or the same as $R_1$. The best results are obtained with acids and alcohols, especially 1-alkanols. Examples of specific compounds which are suitable both because they work well and because they are readily available are 1-octanol, 1-nonanol, 1-decanol, octyloxyethanol, caprylic acid and capric acid. These additives may be use conveniently in a proportion by weight to the amine oxide wetter of from 1:10 to 10:1. Good results are generally obtained by using approximately equal proportions by weight.

By the use of such additives the action of the amine oxides in securing wetting of the leaf surfaces of treated vegetation is increased very effectively; a drop of such a composition alighting upon a leaf tends to spread extensively.

The proportions of amine oxide which can be used depend upon the herbicide to be employed. In general in compositions in accordance with the invention the proportions intended for application to vegetation, e.g. by spraying, will each be within the range of 0.005% to 5.0% by weight and preferably within the range of 0.01% to 1.0% by weight.

In normal practice concentrated solutions, suspensions or normal or invert emulsions, will be prepared for dilution with water by 10 to 1000 times before use.

The compositions may be made by different methods and the herbicide and amine oxide may be mixed together in appropriate proportions, e.g. in a ratio of from 5 to 10 parts by weight of herbicide to 1 part by weight of amine oxide, but this ratio may be varied very widely, e.g. from 100:1 to 1:10, or even more widely than this. Aqueous compositions can be made by agitating a water-free composition with water and any insoluble ingredient is preferably present in finely divided form, but a solution of one or other ingredient may first be prepared if desired. Bipyridylium salts are freely soluble in water and satisfactory compositions of these may accordingly comprise a concentrated aqueous solution of such a salt to which the amine oxide is added.

The invention is illustrated by the following examples, in which all proportions are by weight unless otherwise stated.

EXAMPLE 1

A concentrated aqueous herbicidal composition is prepared by mixing the following ingredients in the proportions stated:

| | Percent |
|---|---|
| 1,1'-dimethyl-4,4'-bipyridylium dichloride | 27.5 |
| Dodecyl dimethylamine oxide | 5.0 |
| Water | 67.5 |

Prior to use the composition is diluted with 50 times its volume of water so as to form a dilute solution containing 0.55% of the bipyridylium salt and 0.1% of the amine oxide.

EXAMPLE 2

A concentrated aqueous herbicidal composition is prepared by mixing the following ingredients in the proportions stated:

|  | Percent |
|---|---|
| 1,1'-ethylene-2,2'-bipyridylium dibromide | 40.0 |
| Dodecyl di(2-hydroxyethyl)amine oxide | 5.0 |
| Water | 55.0 |

Before application the composition is diluted with 80 times its volume of water so as to form a diluted solution containing 0.5% of the biypridylium salt and 0.06% of the amine oxide.

EXAMPLE 3

In this example dilute herbicidal compositions containing different amine oxides were compared with a similar herbicidal composition containing a conventional surface active agent and the effect of the amine oxide, to assist the dissemination of the herbicide within the plant system, is shown.

The aqueous compositions were prepared by dissolving 0.1% of 1,1'-dimethyl-4,4'-bipyridylium dichloride and 0.5% of different amine oxides in water. The herbicidal composition used for control purposes contained 0.5% of "Lubrol" L as the surface active agent. "Lubrol" L is a registered trademark for a surface active agent which comprises a condensation product of nonyl phenol and ethylene oxide.

The amine oxide surface active agents employed in the herbicidal compositions tested were (1) "Pargasol" AO, (2) "Aromox" C/12, (3) dodecyl diethylamine N-oxide, (4) tetradecyl dimethylamine N-oxide, (5) hexadecyl dimethylamine N-oxide and (6) dodecyl morpholine N-oxide. The compositions were tested against cocksfoot (Dactylis glomerata) plants 6" in height and growing in flower pots by immersing a single leaf of each plant to a depth of 1" in the solutions for ten seconds. The degree of damage to the plants after the elapse of eleven days was then noted. A score between 0 (no effect) and 5 (complete kill) was awarded to each plant. The following results were obtained on five plants per treatment.

| Surface active agent: | Damage assessment (max.—25) |
|---|---|
| (1) "Pargasol" AO | 20 |
| (2) "Aromox" C/12 | 23 |
| (3) Dodecyl diethylamine N-oxide | 17 |
| (4) Tetradecyl dimethylamine N-oxide | 18 |
| (5) Hexadecyl dimethylamine N-oxide | 22 |
| (6) Dodecyl morpholine N-oxide | 16 |
| (7) "Lubrol" L | 6 |

EXAMPLE 4

In this example the action of dilute herbicidal compositions containing DS4443 and a variety of herbicides were compared on a variety of plants with the action of similar solutions containing "Lissapol" (trademark) NX as wetter. "Lissapol" NX is a surface active agent comprising a condensation product of nonyl phenol and ethylene oxide.

Results are set out in Table I. The compositions containing in each case 0.05% of wetting agent were sprayed on the plants at the rate in lbs./acre of active ingredient indicated. After the period shown, the sprayed plants were compared visually with unsprayed controls and awarded a score between 0 (indicating no effect) and 5 (indicating a complete kill) on each of four plants per treatment (maximum assessment—20).

The systematic names of the substances shown in Table I are:

Paraquat: 1,1'-dimethyl-4,4'-bipyridylium dichloride
Morfamquat: 1,1'-bis(3,5 dimethylmorpholinocarbamoylmethyl)-4,4'-bipyridylium dibromide
Diquat: 1,1'-ethylene-2,2'-bipyridylium dibromide
Atratone: 6-ethylamino-4-isopropylamino-2-methoxy-1, 3,5-triazine
Fenuron: N,N-dimethyl-N'-phenylurea
Amitrole: 3-amino-1,2,4-triazole
Bromacil: 5-bromo-6-methyl-3-s-butyl-uracil
Dalapon: 2,2-dichloropropionic acid.

TABLE 1

| Plant species | Wetter | Paraquat Assessment (16 days) | Paraquat Conc. (lbs/acre) | Diquat Assessment (5 days) | Diquat Conc. (lbs/acre) | Morfamquat Assessment (11 days) | Morfamquat Conc. (lbs/acre) | Dalapon Assessment (6 days) | Dalapon Conc. (lbs/acre) | Sodium Chlorate Assessment (6 days) | Sodium Chlorate Conc. (lbs/acre) | Bromacil Assessment (13 days) | Bromacil Conc. (lbs/acre) | Atratone Assessment (13 days) | Atratone Conc. (lbs/acre) | Fenuron Assessment (18 days) | Fenuron Conc. (lbs/acre) | Amitrole Assessment (11 days) | Amitrole Conc. (lbs/acre) |
|---|---|---|---|---|---|---|---|---|---|---|---|---|---|---|---|---|---|---|---|
| Cocksfoot | "Lissapol" NX | 4 | 1/15 | 7 | ¼ | | | 7½ | 16 | 10½ | 8 | 4 | 1/16 | 9½ | 1/16 | 17½ | 2 | 8 | 1 |
| | DS4443 | 9 | 1/15 | 15 | ¼ | | | 13½ | 16 | 14½ | 8 | 14 | 1/16 | 17 | 1/16 | 18 | 2 | 8½ | 1 |
| Creeping Bent | "Lissapol" NX | 4½ | 1/25 | 10 | ½ | | | 9½ | 16 | 7½ | 8 | | | ½ | | 7 | 2 | 3 | 1 |
| | DS4443 | 7 | 1/25 | 15 | ½ | | | 13 | 16 | 10 | 8 | | | ½ | | 10 | 2 | 5 | 1 |
| Maize | "Lissapol" NX | 3 | 1/30 | 6½ | 1/16 | 2 | 1/6 | 11 | 32 | 7 | 16 | 2 | 1/16 | ¼ | 1/8 | 4 | ½ | 2½ | 1 |
| | DS4443 | 9 | 1/30 | 9½ | 1/16 | 2 | 1/6 | 14½ | 32 | 16½ | 16 | 3 | 1/16 | ¼ | 1/8 | 4 | ½ | 2½ | 1 |
| Sugar Cane | "Lissapol" NX | | | 14 | ¼ | 9 | ½ | 13 | 8 | | | 4 | 1/16 | 12 | 1/8 | 11 | ½ | 5½ | 2 |
| | DS4443 | | | 16 | ¼ | 12½ | ½ | 13 | 8 | | | 13 | 1/16 | 17 | 1/8 | 13 | ½ | 8½ | 2 |
| Tomato | "Lissapol" NX | | | 16½ | 1/8 | 7 | 2 | 14½ | 8 | 14½ | 8 | 17 | ¼ | 17½ | ¼ | 17 | ½ | 6 | 1 |
| | DS4443 | | | 19 | 1/8 | 12 | 2 | 16½ | 8 | 16½ | 8 | 18 | ¼ | 18½ | ¼ | 18 | ½ | 7 | 1 |
| Radish | "Lissapol" NX | | | | | ³3½ | 1/6 | | | | | | | | | | | | |
| | DS4443 | | | | | ³10 | 1/6 | | | | | | | | | | | | |
| Fat hen | "Lissapol" NX | 5 | 1/10 | | | | | | | | | | | | | | | | |
| | DS4443 | 19½ | 1/10 | | | | | | | | | | | | | | | | |
| Cucumber | "Lissapol" NX | 8 | 1/40 | | | | | | | | | | | | | | | | |
| | DS4443 | 14½ | 1/40 | | | | | | | | | | | | | | | | |

¹ 8 days.  ² 26 days.  ³ 6 days.

EXAMPLE 5

To demonstrate the improved spreading effects obtained by the use of additives of the type R'R²CHX aqueous solutions containing 0.1% Pargasol AO and various amounts of octyloxyethanol were prepared. These were tested on three plants—maize, fat-hen (*Chenopodium album*) and cabbage. In each case one drop of the solutions was placed on a leaf of the plant in question and the spreading effect assessed visually. The spreading effect was awarded a score on a scale varying from 1 (no spreading effect) to 10 (complete spreading all over the leaf surface). Results are shown in Table 2.

Repetitions of these experiments using solutions which additionally contained 1% paraquat (1,1'-dimethyl-4,4'-bipyridylium dichloride) showed that the wetting and spreading properties of the solutions were thereby unaltered; the solutions were most effective weed-killing agents.

TABLE 2

| Conc. of octyloxy-ethanol,¹ percent | Maize | | Fat-hen | | Cabbage | |
|---|---|---|---|---|---|---|
| | Comments | Spreading assessment | Comments | Spreading assessment | Comments | Spreading assessment |
| 0.00 | Wetting, no spread | 1.0 | Wetting, no spread | 1.0 | Good wetting, no spread. | 1.0 |
| 0.01 | Spreading slowly along veins. | 2.0 | Wetting, almost no spread. | 1.5 | Good wetting, almost no spread. | 1.5 |
| 0.05 | Slow spreading along veins. | 2.5 | Slow spreading | 7.0 | Slight spreading | 3.0 |
| 0.09 | Spreading better along veins. | 4.0 | Spreading complete | 10.0 | Spreading along veins. | 7.0 |
| 0.13 | do | 3.5 | Rapid spreading | 10.0 | Spreading along and across veins. | 10.0 |
| 0.17 | Spreading along and across veins. | 6.0 | do | 10.0 | do | 10.0 |
| 0.20 | do | 6.0 | do | 10.0 | do | 10.0 |

¹ Plus 0.1% Pargasol AO.

EXAMPLE 6

Aqueous compositions were prepared containing 0.1% 1,1'-dimethyl-4,4'-bipyridylium dichloride and 0.1% of various surface active agents. The compositions were sprayed onto several varieties of plants. After six days the plants were compared visually with controls and gives a score between 0 (no effect) and 5 (complete kill), on each of four plants per treatment (maximum assessment—20). The results are shown in Table 3 below.

DS4444 is chemically similar to DS4443, but contains an average of 10 ethylene oxide units per amine oxide molecule instead of 5.

TABLE 3

| | Cucumber 1/40 lb./acre | Fat-hen (1/25 lb./acre) | Maize (1/25 lb./acre) | Creeping (1/15 lb./acre) |
|---|---|---|---|---|
| "Lissapol" NX | 8 | 1 | 2 | 7 |
| Aromox C/12 | 15 | 4 | 7½ | 14½ |
| DS4443 | 14½ | 4 | 8½ | 13½ |
| DS4444 | 17½ | 4½ | 5 | 11½ |

EXAMPLE 7

Two aqueous solutions were made up containing 0.5% 2,4D(2,4 dichlorophenoxyacetic acid) and 0.05% surfactant. In the first solution the wetter was "Lissapol" NX; in the second DS4443. These solutions were used to treat tomato plant leaves; for each solution four plants were treated. Two 0.005 ml. droplets were placed in the third leaf and the angle between the stem and the petiole measured. After six days it was measured again. The change in angle is the degree of epinasty induced by the solution; this correlates with herbicidal effect. Results are shown in Table 4.

TABLE 4

| Wetter | Degree of epinasty | | |
|---|---|---|---|
| "Lissapol" NX | 5 | 10 | 18 |
| | 15 | 0 | 15 |
| | 7 | 15 | 20 |
| | 5 | 8 | 0 |
| DS4443 | 40 | 60 | 35 |
| | 60 | 30 | 39 |
| | 40 | 30 | 30 |
| | 60 | 54 | 49 |

What we claim is:

1. A herbicidal composition comprising an effective amount of (A) a herbicide selected from the group consisting of herbicidal amides, carbamates, anilides, diazines, triazines, phenoxycarboxylic acids, bipyridylium salts, aminotriazole, dichloro-propionic acid and inorganic herbicides, and (B) an amine oxide selected from the group consisting of (a) compounds of the formula:

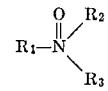

wherein $R_1$ represents an alkyl group of from 5 to 25 carbon atoms, and $R_2$ and $R_3$ are selected from the group consisting of alkyl and alkenyl of 1 to 3 carbon atoms, and alkyl of 1 to 3 carbon atoms substituted by from 1 to 2 hydroxy groups;

(b) compounds of the foregoing formula in which $B_2$ and $R_3$, together with the nitrogen atom to which they are attached form a pyrrolidine, piperidine, hexamethylene amine, or morpholine ring;

(c) compounds of the foregoing formula in which $R_1$ and $R_2$ are selected from alkyl radicals of 6 to 12 carbon atoms, and $R_3$ is selected from alkyl of 1 to 3 carbon atoms substituted by from 1 to 2 hydroxy-groups; and (d) 4-undecylpyridine-N-oxide, 4-butyl- and 4-octyl-N,N-dimethylaniline-N-oxide, and dodecyl di-carboethoxymethylamine-N-oxide.

2. A composition as claimed in claim 2 which also contains water.

3. A composition as claimed in claim 1 which also contains as a spreading agent an aliphatic compound having the formula

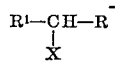

where X is —OH, —COOH, —NH₂, —CONH₂ or —O·CO·H; $R^1$ is a straight chain alkyl or alkoxyalkyl group having not less than 4 and not more than 11 carbon atoms; $R^2$ is hydrogen or a straight chain alkyl or alkoxyalkyl group having from 3 to 5 carbon atoms and the total of carbon atoms in the groups $R^1$ and $R^2$ is between 7 and 11 inclusive.

4. A composition as claimed in claim 3 in which the said aliphatic compound is an acid or an alcohol.

5. A composition as claimed in claim 3 in which $R^2$ is hydrogen or equal to $R^1$.

6. A composition as claimed in claim 1 which contains 0.1–100 parts by weight herbicide to 1 part by weight amine oxide wetter.

7. A composition as claimed in claim 1 wherein the amine oxide wetter is formed from an amine which is a condensate of a primary amine with ethylene oxide.

8. A composition as claimed in claim 7 wherein the amine oxide wetter is formed from an amine which is a condensate of one molar proportion of cocoamine with five molecules of ethylene oxide.

9. A composition as claimed in claim 1 in which the herbicide is a bipyridylium salt.

10. A composition as claimed in claim 9 wherein the herbicide is a salt of 1,1'-ethylene-2,2'-bipyridylium; 1,1-dimethyl-4,4'bipridylium or 1,1'-bis-3,5-dimethylmorpholino-carbonyl-methyl-4,4'-bipyridylium.

11. A composition as claimed in claim 10 which also contains n-octanol, n-decanol, caprylic acid, capric acid or lauric acid.

12. An aqueous composition as claimed in claim 11 which contains from 0.005 to 5.0% by weight of amine oxide wetting agent.

13. A composition as claimed in claim 1 wherein the wetting agent is formed from an amine which is a condensate of one molar proportion of cocoamine oxide with five molecules of ethylene oxide.

14. A composition as claimed in claim 3 wherein the said aliphatic compound is present in a proportion by weight to the amine oxide wetter of between 1:10 and 10:1.

15. A herbicidal composition according to claim 1 consisting essentially of an aqueous solution of herbicide and an amine oxide as wetting agent, the herbicide being selected from herbicidal 4,4'- or 2,2'-bipyridylium herbicides and the amine oxide being selected from octyl dimethylamine N-oxide and corresponding decyl-, dodecyl-, tetradecyl-, pentadecyl- and hexadecyl-dimethylamine N-oxides; and the decyl-, dodecyl-, tetradecyl- and hexadecyl-diethylamine N-oxides or di(2-hydroxy-ethyl)amine N-oxides, said composition containing from 5 to 10 parts herbicide per part of amine oxide with the concentrations of herbicide and amine oxide both being in the range of 0.005 to 5.0% by weight.

16. A process for treating plants which comprises applying to them a composition containing an effective amount of (A) a herbicide selected from the group consisting of herbicidal amides, carbamates, anilides, diazines, triazines, phenoxycarboxylic acids, bipyridylium salts, aminotriazole, dichloro-propionic acid and inorganic herbicides, and (B) an amine oxide selected from the group consisting of (a) compounds of the formula:

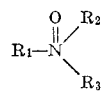

wherein $R_1$ represents an alkyl group of from 5 to 25 carbon atoms, and $R_2$ and $R_3$ are selected from the group consisting of alkyl and alkenyl of 1 to 3 carbon atoms, and alkyl of 1 to 3 carbon atoms substituted by from 1 to 2 hydroxy groups:

(b) compounds of the foregoing formula in which $R_2$ and $R_3$, together with the nitrogen atom to which they are attached form a pyrrolidine, piperidine, hexamethylene amine, or morpholine ring;

(c) compounds of the foregoing formula in which $R_1$ and $R_2$ are selected from alkyl radicals of 6 to 12 carbon atoms, and $R_3$ is selected from alkyl of 1 to 3 carbon atoms substituted by from 1 to 2 hydroxygroups; and (d) 4-undecylpyridine-N-oxide, 4-butyl- and 4-octyl-N,N-dimethylaniline-N-oxide, and dodecyl di-carboethoxymethylamine-N-oxide.

References Cited

UNITED STATES PATENTS

| 3,189,430 | 6/1965 | Kelley et al. | 71—108 X |
| 3,218,148 | 11/1965 | Knusli et al. | 71—92 X |
| 3,240,585 | 3/1966 | Stefcik et al. | 167—42 |

OTHER REFERENCES

Jansan: Weeds, vol. 13, No. 2, April 1965, pp. 117–122.
Jansen: Weeds, vol. 13, No. 2, April 1965, pp. 123–130.
Jansen et al.: Weeds, vol. 9, No. 3, pp. 381–405 (pp. 381, 382, 383, 384, 395, 396, and 397 to 403 particularly relied upon).

LEWIS GOTTS, Primary Examiner

C. L. MILLS, Assistant Examiner

U.S. Cl. X.R.

71—65, 92, 93, 101, 106, 111, 113, 116, 117, 118, 119, 120, 121